United States Patent
Xing

(10) Patent No.: US 9,686,134 B2
(45) Date of Patent: Jun. 20, 2017

(54) METHOD AND CONFIGURATION CENTER SERVER FOR CONFIGURING SERVER CLUSTER

(71) Applicant: TENCENT TECHNOLOGY (SHENZHEN) COMPANY LIMITED, Shenzhen, Guangdong (CN)

(72) Inventor: Yudong Xing, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/778,774

(22) PCT Filed: Feb. 18, 2014

(86) PCT No.: PCT/CN2014/072177
§ 371 (c)(1),
(2) Date: Sep. 21, 2015

(87) PCT Pub. No.: WO2014/146524
PCT Pub. Date: Sep. 25, 2014

(65) Prior Publication Data
US 2016/0043897 A1 Feb. 11, 2016

(30) Foreign Application Priority Data

Mar. 21, 2013 (CN) .......................... 2013 1 0091366

(51) Int. Cl.
*H04L 12/24* (2006.01)
*H04L 29/08* (2006.01)
(Continued)

(52) U.S. Cl.
CPC ............ *H04L 41/0813* (2013.01); *G06F 9/52* (2013.01); *G06F 15/167* (2013.01);
(Continued)

(58) Field of Classification Search
CPC   H04L 41/0813; H04L 67/1097; G06F 15/167
(Continued)

(56) References Cited

U.S. PATENT DOCUMENTS 6,308,243 B1   10/2001   Kido
7,526,479 B2   4/2009   Zenz
(Continued)

FOREIGN PATENT DOCUMENTS

CN   101631140 A   1/2010
CN   102148712 A   8/2011
(Continued)

OTHER PUBLICATIONS

International Preliminary Report on Patentability for International Application No. PCT/CN2014/072177 dated Oct. 1, 2015.
(Continued)

*Primary Examiner* — Suraj Joshi
(74) *Attorney, Agent, or Firm* — Harness, Dickey & Pierce, P.L.C.

(57) ABSTRACT

A method for configuring server cluster includes: judging whether a signal processing function is a default exit value; if not, determining a configuration request is received from a server to be configured; obtaining a write lock from a shared memory and configuration information from a database, writing the configuration information in the shared memory, releasing the write lock; if receiving an exit signal between obtaining and releasing the write lock, setting the signal processing function to be the default exit value; obtaining a read lock from the shared memory, reading the configuration information from the shared memory, sending the read configuration information to the server, releasing the read lock, returning to the step of judging whether a signal processing function is a default exit value; if receiving the exit signal between obtaining and releasing the read lock,
(Continued)

setting the signal processing function to be the default exit value.

10 Claims, 3 Drawing Sheets

(51) Int. Cl.
    *G06F 15/167*     (2006.01)
    *G06F 9/52*     (2006.01)

(52) U.S. Cl.
    CPC ...... *H04L 41/0859* (2013.01); *H04L 41/0869* (2013.01); *H04L 67/1097* (2013.01)

(58) Field of Classification Search
    USPC .......................................................... 709/223
    See application file for complete search history.

(56) References Cited

U.S. PATENT DOCUMENTS

| | | | |
|---|---|---|---|
| 2002/0194526 A1* | 12/2002 | Ulrich | G06F 3/061 |
| | | | 714/6.12 |
| 2010/0082664 A1* | 4/2010 | Odaira | G06F 17/30327 |
| | | | 707/769 |
| 2011/0185047 A1 | 7/2011 | Vaidyanathan et al. | |
| 2012/0136946 A1 | 5/2012 | Cui et al. | |

FOREIGN PATENT DOCUMENTS

| | | |
|---|---|---|
| CN | 102333029 A | 1/2012 |
| CN | 102932408 A | 2/2013 |
| WO | 2014146524 A1 | 9/2014 |

OTHER PUBLICATIONS

International Search Report and Office Action for International Application No. PCT/CN2014/072177 dated May 28, 2014.

Chinese Office Action for Application No. 201310091366X dated Apr. 19, 2017, and an English concise explanation of relevance thereof.

* cited by examiner

METHOD AND CONFIGURATION CENTER SERVER FOR CONFIGURING SERVER CLUSTER

This application is a continuation of International Application No. PCT/CN2014/072177, filed on Feb. 18, 2014, which claims priority to Chinese patent application No. 201310091366.X, filed on Mar. 21, 2013, the entire contents of which are hereby incorporated by reference.

FIELD OF THE DISCLOSURE

The present disclosure relates to server configuration technologies, and more particularly to a method and configuration center server for configuring server cluster.

BACKGROUND

With the popularity of internet businesses, the amount of users is greatly increased. For a business, a single server has been far from providing services. Based on this, a large-scale server cluster has emerged. The server cluster refers to a group of servers which cooperate to complete one or a plurality if particular functions in the internet businesses. Configuration of all servers in the server cluster can be completed by a configuration system. A configuration center server of the configuration system reads configuration information from a database and issues the configuration information to the servers.

One solution for configuring server cluster in the related art includes: after receiving a configuration request from a server to be configured, a configuration center server obtains write lock from a local shared memory, obtains configuration information from a database of a configuration center and writes the configuration information in the shared memory, releases the write lock; obtains a read lock, reads the configuration information from the local shared memory, sends the read configuration information to the server to be configured, and releases the read lock.

The write lock and the read lock are stored in the shared memory of the configuration center server.

The write lock and the read lock are used for Linux inter-process communication. The read lock is also referred as shared lock, and the write lock is also referred as exclusive lock. The read lock and the write lock are often collectively referred to as read-write lock. When the read-write lock is locked in read mode, the read-write lock is locked in shared mode. When the read-write lock is locked in write mode, the read-write lock is locked in exclusive mode. That is, multiple processes or threads can simultaneously be in a read-write lock in read mode, while in a read-write lock in write mode, only one process is exclusive.

In the above process, the processing time between obtaining the write block and releasing the write lock as well as between obtaining the read lock and releasing the read lock is longer, i.e., it needs to take a longer time to write data and read data. Once an anomaly appears between obtaining the write block and releasing the write lock, an exit signal is received and the process will exit, and it will be too late to release the write lock stored in the shared memory; if the configuration center server subsequently receives a configuration request from a server to be configured, this will lead to a deadlock, the configuration information obtained from the database cannot be written into the shared memory, and then it is unable to read the configuration information from the shared memory and issue the configuration information to the sever to be configured. Similarly, once an anomaly appears between obtaining the read block and releasing the read lock, the process will exit, and it will be too late to release the read lock stored in the shared memory; if the configuration center server subsequently receives a configuration request from a server to be configured, there is no available read lock and this will lead to a deadlock, and the configuration information cannot be issued to the server to be configured.

Thus, the existing solution for configuring server cluster has following defects: when exiting abnormally, this will lead to a deadlock and the configuration information cannot be successfully issued to the server to be configured.

SUMMARY

One embodiment of the present disclosure provides a method for configuring server cluster, which can avoid deadlock caused by exiting abnormally and can successfully issue configuration information to a server to be configured.

One embodiment of the present disclosure provides a configuration center server for configuring server cluster, which can avoid deadlock caused by exiting abnormally and can successfully issue configuration information to a server to be configured.

A method for configuring server cluster includes:

judging whether a signal processing function is a default exit value; if yes, exiting and ending the process; otherwise, determining that a configuration request is received from a server to be configured;

obtaining a write lock from a shared memory, obtaining configuration information from a database, writing the configuration information in the shared memory, releasing the write lock; if receiving an exit signal between obtaining the write lock and releasing the write lock, setting the signal processing function to be the default exit value;

obtaining a read lock from the shared memory, reading the configuration information from the shared memory, sending the read configuration information to the server to be configured, releasing the read lock, returning to the step of judging whether a signal processing function is a default exit value; if receiving the exit signal between obtaining the read lock and releasing the read lock, setting the signal processing function to be the default exit value.

A configuration center server for configuring server cluster includes a setting unit, a function judgment unit, a configuration request processing unit, a write processing unit and a read processing unit; wherein the setting unit is configured to set a signal processing function, receive setting instructions from the write processing unit and the read processing unit, and set the signal processing function to be a default exit value;

the function judgment unit is configured to judge whether the signal processing function is the default exit value; if yes, not send a start instruction to the configuration request processing unit; otherwise, sending the start instruction to the configuration request processing unit;

the configuration request processing unit is configured to receive the start instruction from the function judgment unit, determine that a configuration request is received from a server to be configured, and send a write instruction to the write processing unit;

the write processing unit is configured to, after receiving the write instruction from the configuration request processing unit, obtain a write lock from a local shared memory, obtain configuration information from the database, write the configuration information in the shared memory, release the write lock, and send a read instruction to the read processing unit; if receiving an exit signal between obtaining the write lock and releasing the write lock, send the setting instruction to the setting unit;

the read processing unit is configured to receive the read instruction from the write processing unit, obtain a read lock from the shared memory, read the configuration information from the shared memory, send the read configuration information to the server to be configured, release the read lock; if receiving the exit signal between obtaining the read lock and releasing the read lock, send the setting instruction to the setting unit.

A configuration center includes a configuration center server and a database; wherein the configuration center server includes a memory and a processor;

the memory stores a setting unit, a function judgment unit, a configuration request processing unit, a write processing unit and a read processing unit;

the processor communicates with the memory, and executes the setting unit, the function judgment unit, the configuration request processing unit, the write processing unit and the read processing unit;

when the setting unit, the function judgment unit, the configuration request processing unit, the write processing unit and the read processing unit are executed by the processor, the setting unit is configured to set a signal processing function, receive setting instructions from the write processing unit and the read processing unit, and set the signal processing function to be a default exit value;

the function judgment unit is configured to judge whether the signal processing function is the default exit value; if yes, not send a start instruction to the configuration request processing unit; otherwise, sending the start instruction to the configuration request processing unit;

the configuration request processing unit is configured to receive the start instruction from the function judgment unit, determine that a configuration request is received from a server to be configured, and send a write instruction to the write processing unit;

the write processing unit is configured to, after receiving the write instruction from the configuration request processing unit, obtain a write lock from a local shared memory, obtain configuration information from the database, write the configuration information in the shared memory, release the write lock, and send a read instruction to the read processing unit; if receiving an exit signal between obtaining the write lock and releasing the write lock, send the setting instruction to the setting unit;

the read processing unit is configured to receive the read instruction from the write processing unit, obtain a read lock from the shared memory, read the configuration information from the shared memory, send the read configuration information to the server to be configured, release the read lock; if receiving the exit signal between obtaining the read lock and releasing the read lock, send the setting instruction to the setting unit.

It can be seen from the above technical solution, in one embodiment of the present disclosure, first judging the signal processing function; if the signal processing function is not the default exit value and a configuration request is received from a server to be configured, then obtaining a write lock from a shared memory, obtaining configuration information from a database, writing the configuration information in the shared memory, releasing the write lock; if receiving an exit signal between obtaining the write lock and releasing the write lock, setting the signal processing function to be the default exit value; then, obtaining a read lock from the shared memory, reading the configuration information from the shared memory, sending the read configuration information to the server to be configured, releasing the read lock, returning to the step of judging whether a signal processing function is a default exit value; if receiving the exit signal between obtaining the read lock and releasing the read lock, setting the signal processing function to be the default exit value. For situations of receiving an exit signal between obtaining the write block and releasing the write lock as well as between obtaining the read lock and releasing the read lock, in one embodiment of the present disclosure, combined with the signal processing function, the exit signal is performed only after the write lock and the read lock have been released, this can avoid deadlock caused by exiting abnormally, and can successfully issue the configuration information to the server to be configured.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Figure 1:
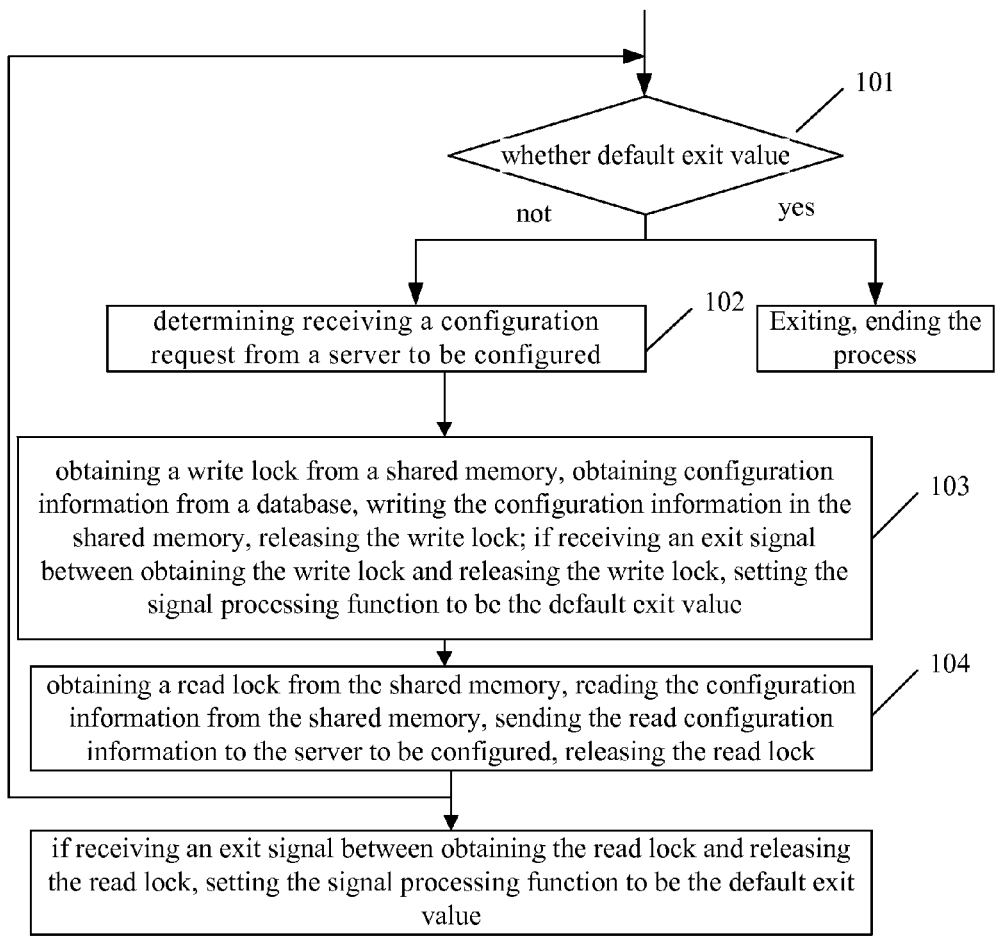
FIG. 1 is a schematic flow chart of a method for configuring server cluster according tone embodiment of the present disclosure.

For situations of receiving an exit signal between obtaining the write block and releasing the write lock as well as between obtaining the read lock and releasing the read lock, in one embodiment of the present disclosure, combined with a signal processing function, the exit signal is performed only after the write lock and the read lock have been released, this can avoid deadlock caused by exiting abnormally. Referring to FIG. 1, FIG. 1 is a schematic flow chart of a method for configuring server cluster according tone embodiment of the present disclosure. A signal processing function is preset in the method of one embodiment of the present disclosure. Initially, a default value such as 0 can be set for the signal processing function; in follow-up process, if receiving an exit signal between obtaining the write block and releasing the write lock or between obtaining the read lock and releasing the read lock, the signal processing function is set to be a default exit value, such as 1.

A process shown in FIG. 1 includes following steps:

Step 101: judging whether a signal processing function is a default exit value; if yes, exiting and ending the process; other wise, performing step 102.

The judgment of the signal processing function can be performed randomly or periodically.

Step 102: determining that a configuration request is received from a server to be configured.

When judging that the signal processing function is not the default exit value, if determining that no configuration request is received from the server to be configured, returning to perform the step 101 until receiving a configuration request from the server to be configured.

Step 103: obtaining a write lock from a shared memory, obtaining configuration information from a database, writing the configuration information in the shared memory, releasing the write lock; if receiving an exit signal between obtaining the write lock and releasing the write lock, setting the signal processing function to be the default exit value.

For a situation that the configuration information is not updated and is still an earlier version, it is not needed to rewrite the configuration information in a local shared memory and step 104 can be directly performed. In order to simplify the process, before this step, the method can further specifically include: judging whether the configuration information is updated; if the configuration information is updated, performing the step 103; otherwise, performing the step 104. Judging whether the configuration information in the shared memory is updated can be realized by labeling. For example, if the configuration information stored in a database of a configuration center is updated, an update instruction carrying a latest version number is sent to a configuration center server, the configuration center server receives the update instruction and determines that the configuration information is updated.

Step 104: obtaining a read lock from the shared memory, reading the configuration information from the shared memory, sending the read configuration information to the server to be configured, releasing the read lock, returning to perform the step 101; if receiving an exit signal between obtaining the read lock and releasing the read lock, setting the signal processing function to be the default exit value.

Since the server cluster contains a plurality of servers and has a large capacity of configuration information, thus every time issuing configuration information to the server to be configured will occupy a large flow of resources. In one embodiment of the present disclosure, in order to improve this defect, the configuration request in the step 102 can carry a version number of configuration information currently used by the server to be configured; after receiving the configuration request, the configuration center server compares the version numbers; the configuration information is issued only if the version numbers are different. Specifically, the following two implementation manners can be adopted.

Manner one: before the step 104 of the process shown in FIG. 1, the method further includes: judging whether a version number contained in the configuration request is the same as a version number of the configuration information in the shared memory; if yes, feeding back a response message of no need of updating to the server to be configured; otherwise, performing the step 104.

Manner two: after obtaining the read lock in the step 104, the method further includes: judging whether a version number contained in the configuration request is the same as a version number of the configuration information in the shared memory; if yes, feeding back a response message of no need of updating to the server to be configured, and releasing the read lock; otherwise, performing obtaining the configuration information from the local shared memory of the step 104.

Adopting the technical solution of the present disclosure, for situations of receiving an exit signal between obtaining the write block and releasing the write lock as well as between obtaining the read lock and releasing the read lock, in one embodiment of the present disclosure, combined with the signal processing function, the exit signal is performed only after the write lock and the read lock have been released, this can avoid deadlock caused by exiting abnormally, and can successfully issue the configuration information to the server to be configured.

Figure 2:
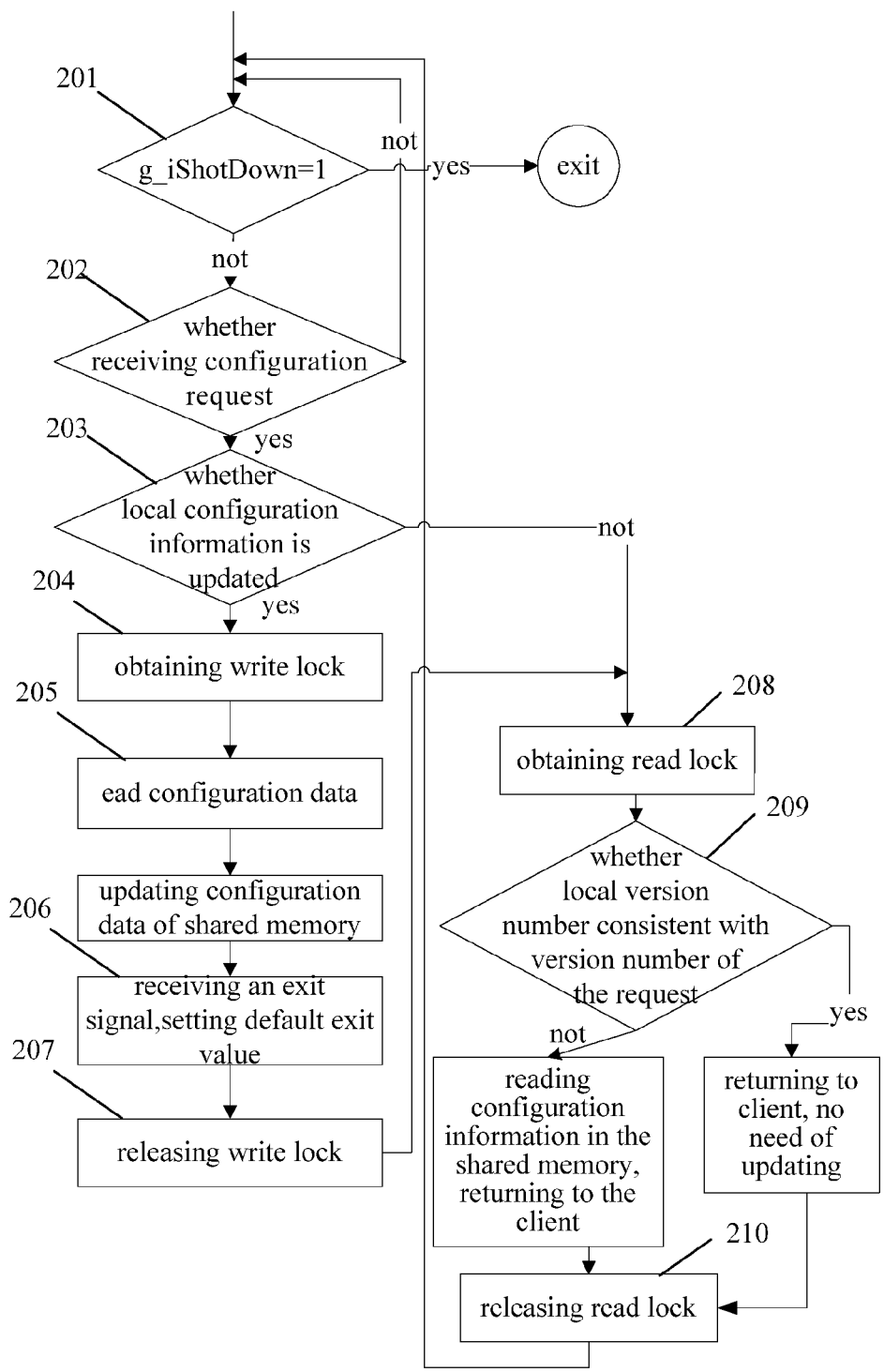
FIG. 2 is a schematic flow chart of an example of the method for configuring server cluster according tone embodiment of the present disclosure.

Referring to FIG. 2, the method for configuring server cluster will be described with an example. In this example, a signal processing function is preset. The process shown in FIG. 2 includes following steps:

Step 201: judging whether a signal processing function is a default exit value; if yes, exiting and ending the process; other wise, performing step 202.

A default value of the signal processing function can be set to be 0, and the default exit value can be set to be 1.

Setting of the signal processing function and the judgment about whether the signal processing function is the default exit value are asynchronous. When the exit signal occurs, immediately setting the signal processing function; the judgment of whether the signal processing function is the default exit value can be performed periodically or randomly. In actual implementation, the signal processing function (g_iShutDown) can adopt the following configuration manner:

```
int g_iShutDown = 0;           --------setting g_iShutDown to be 0
void SetShutDownFlag(int signo)
{
  if(signo == SIGQUIT)
  {
    printf("catch SIGQUIT!\n");
    g_iShutDown = 1;
  } --if capturing a setting instruction SIGQUIT, then setting g_iShutDown to be 1
  if(signo == SIGUSR1)
  {
    printf("catch SIGUSR1!\n");
    g_iShutDown = 1;
  } --if capturing a setting instruction SIGQUIT1, then setting g_iShutDownto be 1
}
```

SIGQUIT is a setting instruction when receiving the exit signal between obtaining the write lock and releasing the write lock; SIGQUIT1 is a setting instruction when receiving the exit signal between obtaining the write read and releasing the read lock.

Step 202: judging whether a configuration request is received from a server to be configured; if yes, performing step 203; otherwise, returning to perform the step 201.

The configuration request contains a version number; in this step, if no configuration request is received, continuing to judge the signal processing function.

Step 203: judging whether the configuration information is updated; if yes, performing step 204; otherwise, performing step 208.

The configuration information can be input by a staff into a database of a configuration center; then, the staff can update the configuration information in the database; after updating, the database sends an update instruction carrying a latest version number to a configuration center server; the configuration center server sets an update item to be updated. In this embodiment, if the configuration center server learns that the update item is set to be updated, then the configuration center server determines that the configuration information is updated.

Step 204: obtaining a write lock from a shared memory.

The write lock and the read lock are stored in the shared memory of the configuration center server. The write lock and the read lock are used for Linux inter-process communication. The read lock is also referred as shared lock, and the write lock is also referred as exclusive lock. The read lock and the write lock are often collectively referred to as read-write lock. When the read-write lock is locked in read mode, the read-write lock is locked in shared mode. When the read-write lock is locked in write mode, the read-write lock is locked in exclusive mode. That is, multiple processes or threads can simultaneously be in a read-write lock in read mode, while in a read-write lock in write mode, only one process is exclusive.

Step 205: obtaining the configuration information from the database, and writing the obtained configuration information in the shared memory.

In the writing process of the write lock, reading cannot be performed, avoiding that the read data is incomplete. The obtained configuration information is written in the shared memory, and covers the configuration information previously stored in the shared memory for updating.

Step 206: receiving an exit signal, and setting the signal processing function to be the default exit value.

Step 207: releasing the write lock.

Step 208: obtaining a read lock from the shared memory.

In actual implementation, a Fork child process can be adopted to realize the step of obtaining the read lock, version number judgment, data reading, data issuing and releasing the read lock.

Step 209: judging whether a version number contained in the configuration request is the same as a version number of the configuration information in the shared memory; if yes, feeding back a response message of no need of updating to the server to be configured; otherwise, reading the configuration information from the shared memory, and sending the read configuration information to the server to be configured.

Step 210: releasing the read lock, and returning to perform the step 201.

When performing the step 201, since the signal processing function has been set to be the default exit value in the step 206, thus, performing exiting and ending the process.

Adopting the above solution, if receiving an exit signal between obtaining the write lock in the step 204 and releasing the write lock in the step 207, between obtaining the read lock in the step 208 and releasing the read lock in the step 210, temporarily not responding to the exit signal; continuing to perform the subsequent steps until the write lock and the read lock have been released, and then performing exiting. In this way, For situations of receiving an exit signal between obtaining the write block and releasing the write lock as well as between obtaining the read lock and releasing the read lock, exiting can be performed after the write lock and the read lock have been released, this can avoid deadlock in such a situation in the related art. Further, by comparing the version numbers, the amount of issued data can be reduced, resources can be saved and the process can be simplified.

Figure 3:
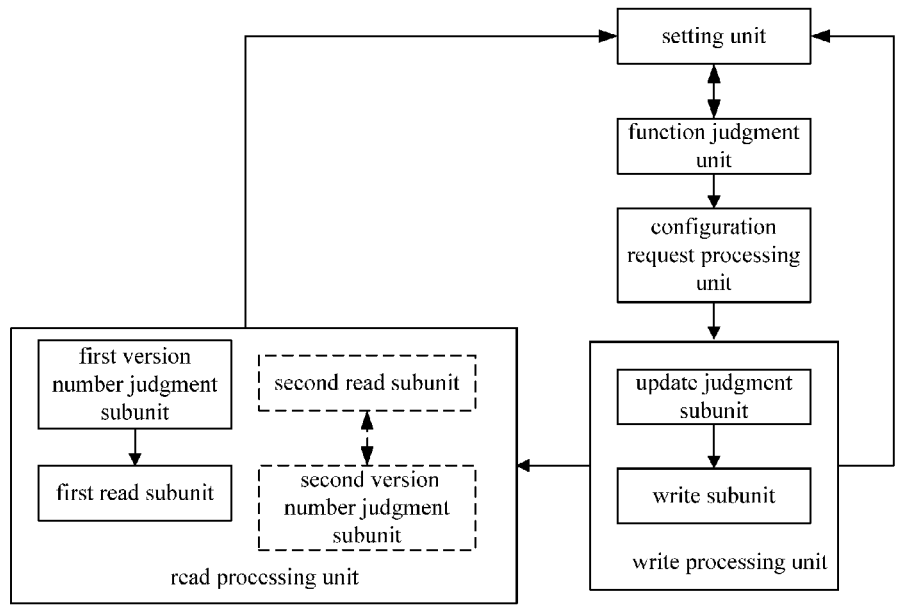
FIG. 3 is a schematic diagram of a configuration center server for configuring server cluster according to one embodiment of the present disclosure.

The configuration center includes the configuration center server and the database. The database is configured to store configuration information. When required, the configuration center server can obtain the configuration information from the database. Referring to FIG. 3, FIG. 3 is a schematic diagram of a configuration center server for configuring server cluster according to one embodiment of the present disclosure. The configuration center server includes a setting unit, a function judgment unit, a configuration request processing unit, a write processing unit and a read processing unit.

The setting unit is configured to set a signal processing function, receive setting instructions from the write processing unit and the read processing unit, and set the signal processing function to be a default exit value.

The function judgment unit is configured to judge whether the signal processing function is the default exit value; if yes, not send a start instruction to the configuration request processing unit; otherwise, sending the start instruction to the configuration request processing unit.

The configuration request processing unit is configured to receive the start instruction from the function judgment unit, determine that a configuration request is received from a server to be configured, and send a write instruction to the write processing unit.

The write processing unit is configured to, after receiving the write instruction from the configuration request processing unit, obtain a write lock from a local shared memory, obtain configuration information from the database, write the configuration information in the shared memory, release the write lock, and send a read instruction to the read processing unit; if receiving an exit signal between obtaining the write lock and releasing the write lock, send the setting instruction to the setting unit.

The read processing unit is configured to receive the read instruction from the write processing unit, obtain a read lock from the shared memory, read the configuration information from the shared memory, send the read configuration information to the server to be configured, release the read lock; if receiving an exit signal between obtaining the read lock and releasing the read lock, send the setting instruction to the setting unit.

The configuration request contains a version number. The read processing unit includes a first version number judgment subunit and a first read subunit.

The first version number judgment subunit is configured to receive the read instruction from the write processing unit, judge whether the version number contained in the configuration request from the server to be configured is the same as a version number of the configuration information in the shared memory; if yes, feed back a response message of no need of updating to the server to be configured; otherwise, send the start instruction to the first read subunit.

The first read subunit is configured to receive the start instruction from the first version number judgment subunit, obtain the read lock from the shared memory, read the configuration information from the shared memory, send the read configuration information to the server to be configured, release the read lock; if receiving an exit signal between obtaining the read lock and releasing the read lock, send the setting instruction to the setting unit.

The configuration request contains a version number. The read processing unit includes a second version number judgment subunit and a second read subunit.

The second read subunit is configured to receive the read instruction from the write processing unit, obtain the read lock from the shared memory, send a version number judgment instruction to the second version number judgment subunit; receive a configuration information read instruction from the second version number judgment subunit, read the configuration information from the shared memory, send the read configuration information to the server to be configured, release the read lock; if receiving an exit signal between obtaining the read lock and releasing the read lock, send the setting instruction to the setting unit.

The second version number judgment subunit is configured to receive the version number judgment instruction from the second read subunit, judge whether the version number contained in the configuration request from the server to be configured is the same as a version number of the configuration information in the shared memory; if yes, feed back a response message of no need of updating to the server to be configured; otherwise, send the configuration information read instruction to the second read subunit.

The write processing unit includes an update judgment subunit and a write subunit.

The update judgment subunit is configured to, after receiving the write instruction from the configuration request processing unit, judge whether the configuration information is updated; if yes, send the start instruction to the write subunit; otherwise, send the read instruction to the read processing unit.

The write subunit is configured to receive the start instruction from the update judgment subunit, obtain the write lock from the shared memory, obtain configuration information from the database, write the configuration information in the shared memory, release the write lock, and send the read instruction to the read processing unit; if receiving an exit signal between obtaining the write lock and releasing the write lock, send the setting instruction to the setting unit.

Figure 4:
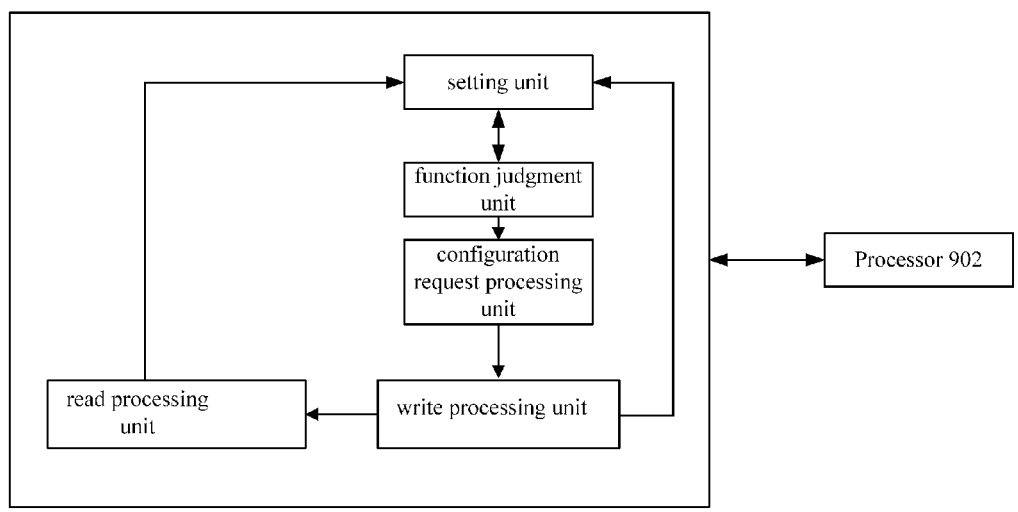
FIG. 4 is a schematic diagram of a configuration center server for configuring server cluster according to one embodiment of the present disclosure.

FIG. 4 is a schematic diagram of a configuration center server for configuring server cluster according to one embodiment of the present disclosure. Referring to FIG. 4, the configuration center server for configuring server cluster may include a memory 901 and a processor 902.

The memory 901 may be to store a setting unit, a function judgment unit, a configuration request processing unit, a write processing unit and a read processing unit.

The processor 902 may be to communicate with the memory 901, execute the setting unit, the function judgment unit, the configuration request processing unit, the write processing unit and the read processing unit. Functions of the setting unit, the function judgment unit, the configuration request processing unit, the write processing unit and the read processing unit stored in the memory 901 are the same as those of the setting unit, the function judgment unit, the configuration request processing unit, the write processing unit and the read processing unit shown in FIG. 3.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for configuring server cluster comprising:
   judging whether a signal processing function is a default exit value; if yes, exiting and ending a process; otherwise,
   determining that a configuration request is received from a server to be configured;
   obtaining a write lock from a shared memory to prevent other processes from accessing the shared memory, obtaining configuration information from a database, writing the configuration information in the shared memory, releasing the write lock to enable the other processes to access the shared memory; if receiving an exit signal between obtaining the write lock and releasing the write lock, setting the signal processing function to be the default exit value;
   obtaining a read lock from the shared memory, reading the configuration information from the shared memory, sending the read configuration information to the server to be configured, releasing the read lock, returning to the step of judging whether a signal processing function is a default exit value; if receiving the exit signal between obtaining the read lock and releasing the read lock, setting the signal processing function to be the default exit value.

2. The method of claim 1, wherein the configuration request contains a version number, before the obtaining a read lock, the method further comprises:
   judging whether the version number contained in the configuration request is the same as a version number of the configuration information in the shared memory; if yes, feeding back a response message of no need of updating to the server to be configured; otherwise, performing the step of obtaining a read lock.

3. The method of claim 1, wherein the configuration request contains a version number, after the obtaining a read lock, the method further comprises:
   judging whether the version number contained in the configuration request is the same as a version number of the configuration information in the shared memory; if yes, feeding back a response message of no need of updating to the server to be configured, and releasing the read lock; otherwise, performing the step of obtaining the configuration information from the local shared memory.

4. The method of claim 1, wherein before the obtaining a write lock, the method further comprises: judging whether the configuration information is updated; if yes, performing the step of obtaining a write lock; otherwise, performing the step of obtaining a read lock.

5. The method of claim 1, wherein the judging whether a signal processing function is a default exit value comprises: periodically judging whether a signal processing function is the default exit value.

6. The method of claim 1, wherein when judging that the signal processing function is not the default exit value, if determining that no configuration request is received from the server to be configured, returning to perform the step of judging whether a signal processing function is a default exit value.

7. A configuration center server for configuring server cluster comprising: a memory and a processor;
   wherein the memory comprises: a setting unit, a function judgment unit, a configuration request processing unit, a write processing unit and a read processing unit; wherein
   the processor communicates with the memory, and operates the setting unit, the function judgment unit, the configuration request processing unit, the write processing unit and the read processing unit;
   when the setting unit, the function judgment unit, the configuration request processing unit, the write processing unit and the read processing unit are operated by the processor,
   the setting unit is configured to set a signal processing function, receive setting instructions from the write processing unit and the read processing unit, and set the signal processing function to be a default exit value;
   the function judgment unit is configured to judge whether the signal processing function is the default exit value; if yes, not send a start instruction to the configuration request processing unit; otherwise, sending the start instruction to the configuration request processing unit;
   the configuration request processing unit is configured to receive the start instruction from the function judgment unit, determine that a configuration request is received from a server to be configured, and send a write instruction to the write processing unit;
   the write processing unit is configured to, after receiving the write instruction from the configuration request processing unit, obtain a write lock from a local shared memory to prevent other processes from accessing the shared memory, obtain configuration information from the database, write the configuration information in the shared memory, release the write lock to enable the other processes to access the shared memory, and send a read instruction to the read processing unit; if receiving an exit signal between obtaining the write lock and releasing the write lock, send the setting instruction to the setting unit;
   the read processing unit is configured to receive the read instruction from the write processing unit, obtain a read lock from the shared memory, read the configuration information from the shared memory, send the read configuration information to the server to be configured, release the read lock; if receiving the exit signal between obtaining the read lock and releasing the read lock, send the setting instruction to the setting unit.

8. The configuration center server for configuring server cluster of claim 7, wherein the configuration request contains a version number; the read processing unit comprises a first version number judgment subunit and a first read subunit;
   the first version number judgment subunit is executed by the processor to receive the read instruction from the write processing unit, judge whether the version number contained in the configuration request from the server to be configured is the same as a version number of the configuration information in the shared memory; if yes, feed back a response message of no need of updating to the server to be configured; otherwise, send the start instruction to the first read subunit;
   the first read subunit is executed by the processor to receive the start instruction from the first version number judgment subunit, obtain the read lock from the shared memory, read the configuration information from the shared memory, send the read configuration information to the server to be configured, release the read lock; if receiving the exit signal between obtaining the read lock and releasing the read lock, send the setting instruction to the setting unit.

9. The configuration center server for configuring server cluster of claim 7, wherein the configuration request contains a version number; the read processing unit comprises a second version number judgment subunit and a second read subunit;
   the second read subunit is executed by the processor to receive the read instruction from the write processing unit, obtain the read lock from the shared memory, send a version number judgment instruction to the second version number judgment subunit; receive a configuration information read instruction from the second version number judgment subunit, read the configuration information from the shared memory, send the read configuration information to the server to be configured, release the read lock; if receiving the exit signal between obtaining the read lock and releasing the read lock, send the setting instruction to the setting unit;
   the second version number judgment subunit is executed by the processor to receive the version number judgment instruction from the second read subunit, judge whether the version number contained in the configuration request from the server to be configured is the same as a version number of the configuration information in the shared memory; if yes, feed back a response message of no need of updating to the server to be configured, release the read lock; otherwise, send the configuration information read instruction to the second read subunit.

10. The configuration center server for configuring server cluster of claim 7, wherein the write processing unit includes an update judgment subunit and a write subunit;
    the update judgment subunit is executed by the processor to, after receiving the write instruction from the configuration request processing unit, judge whether the configuration information is updated; if yes, send the start instruction to the write subunit; otherwise, send the read instruction to the read processing unit;
    the write subunit is executed by the processor to receive the start instruction from the update judgment subunit, obtain the write lock from the shared memory, obtain configuration information from the database, write the configuration information in the shared memory, release the write lock, and send the read instruction to the read processing unit; if receiving the exit signal between obtaining the write lock and releasing the write lock, send the setting instruction to the setting unit.

* * * * *